United States Patent
Feng et al.

(10) Patent No.: US 12,484,408 B2
(45) Date of Patent: Nov. 25, 2025

(54) ARRAY SUBSTRATE, DISPLAY PANEL AND DISPLAY DEVICE

(71) Applicant: Hefei Visionox Technology Co., Ltd., Anhui (CN)

(72) Inventors: Hongqing Feng, Hefei (CN); Hongrui Li, Hefei (CN); Xiangtao Zeng, Hefei (CN); Shaoyang Qin, Hefei (CN); Chengyu Zhao, Hefei (CN); Shoukun Wang, Hefei (CN)

(73) Assignee: Hefei Visionox Technology Co., Ltd., Hefei (CN)

( * ) Notice: Subject to any disclaimer, the term of this patent is extended or adjusted under 35 U.S.C. 154(b) by 379 days.

(21) Appl. No.: 18/341,064

(22) Filed: Jun. 26, 2023

(65) Prior Publication Data

US 2023/0345785 A1 Oct. 26, 2023

Related U.S. Application Data

(63) Continuation of application No. PCT/CN2021/129200, filed on Nov. 8, 2021.

(30) Foreign Application Priority Data

Feb. 24, 2021 (CN) .......................... 202110206171.X

(51) Int. Cl.
*H10K 59/131* (2023.01)
*H10K 59/65* (2023.01)

(52) U.S. Cl.
CPC ......... *H10K 59/1315* (2023.02); *H10K 59/65* (2023.02)

(58) Field of Classification Search
CPC .. H10K 59/1315; H10K 59/65; H10K 59/131; H10K 59/121; H10K 59/60;
(Continued)

(56) References Cited

U.S. PATENT DOCUMENTS 10,438,570 B2 * 10/2019 Nakao .................. G09G 3/3677
10,475,864 B2 * 11/2019 Chun .................... H10K 77/111
(Continued)

FOREIGN PATENT DOCUMENTS

CN        107633812 A        1/2018
CN        107634072 A        1/2018
(Continued)

OTHER PUBLICATIONS

Office Action issued on Nov. 29, 2024, in corresponding Korean Application No. 10-2023-7021705, 16 pages.
(Continued)

*Primary Examiner* — Caleb E Henry
(74) *Attorney, Agent, or Firm* — Maier & Maier, PLLC

(57) ABSTRACT

An array substrate including: pixel circuits; first signal lines including first-type signal lines and second-type signal lines, each second-type signal line includes a first segment and a second segment separated by a hole area; first connection signal lines, at least a number of the plurality of first connection signal lines is located in a display area, each first connection signal line includes a first connection segment, a second connection segment and a third connection segment connected to each other; first compensation signal lines; an orthographic projection of the first connection signal lines on a plane where the array substrate is located does not overlap with an orthographic projection of the pixel circuits on the plane, and an orthographic projection of the first compensation signal lines on the plane does not overlap with the orthographic projection of the pixel circuits on the plane.

17 Claims, 9 Drawing Sheets

(58) Field of Classification Search
CPC ............... H10K 59/18; H10K 77/111; H10K 2102/311; G09F 9/30; G09F 9/301; H04N 23/57; G09G 3/3233; G09G 3/3275; G09G 2380/02; G09G 3/3208; G09G 3/32; G09G 2300/026; G09G 2300/0426; G06F 3/1446; G06F 3/147; H01L 27/156; H01L 27/3293; H01L 51/0097; H01L 2251/5338; H01L 27/3276; Y02E 10/549
See application file for complete search history.

(56) References Cited

U.S. PATENT DOCUMENTS

| | | | | |
|---|---|---|---|---|
| 10,503,297 | B2* | 12/2019 | Zeng | H04M 1/0266 |
| 10,575,403 | B2* | 2/2020 | Park | G02F 1/1333 |
| 10,629,110 | B2* | 4/2020 | Seo | G09G 3/3266 |
| 10,651,120 | B1* | 5/2020 | Tsai | H10K 77/111 |
| 10,692,438 | B2* | 6/2020 | Yang | H10D 86/441 |
| 10,991,315 | B2* | 4/2021 | Li | G09G 3/3225 |
| 11,069,720 | B2* | 7/2021 | Tao | H10K 59/1315 |
| 2014/0098471 | A1* | 4/2014 | Nam | G06F 1/165 |
| | | | | 361/679.01 |
| 2014/0217373 | A1* | 8/2014 | Youn | H10K 59/805 |
| | | | | 438/23 |
| 2015/0036300 | A1* | 2/2015 | Park | H05K 1/147 |
| | | | | 156/212 |
| 2015/0103500 | A1* | 4/2015 | Bae | H05K 1/111 |
| | | | | 228/102 |
| 2016/0172428 | A1* | 6/2016 | Song | H10K 59/131 |
| | | | | 257/40 |
| 2018/0040638 | A1* | 2/2018 | Wu | H10D 86/411 |
| 2018/0151663 | A1 | 5/2018 | Kim et al. | |
| 2018/0284935 | A1* | 10/2018 | Lee | G06F 1/1656 |
| 2018/0301520 | A1* | 10/2018 | Jin | H10D 86/441 |
| 2018/0324939 | A1* | 11/2018 | Wang | H05K 1/115 |
| 2019/0109184 | A1* | 4/2019 | Li | G06F 1/163 |
| 2019/0179591 | A1* | 6/2019 | Kuo | G06F 3/1446 |
| 2019/0221762 | A1* | 7/2019 | Saeki | H10K 77/111 |
| 2019/0281699 | A1* | 9/2019 | Bae | H05K 1/111 |
| 2019/0304558 | A1* | 10/2019 | Dun | G11C 19/287 |
| 2019/0386089 | A1* | 12/2019 | Hsu | H10K 77/111 |
| 2020/0218388 | A1* | 7/2020 | Wu | G06F 3/0416 |
| 2020/0242996 | A1* | 7/2020 | Wang | G09G 3/2074 |
| 2021/0029829 | A1* | 1/2021 | Liu | H04M 1/0269 |
| 2021/0036064 | A1 | 2/2021 | Jang et al. | |
| 2021/0201730 | A1* | 7/2021 | Gao | G09G 3/20 |
| 2022/0130318 | A1* | 4/2022 | Kang | G09G 3/3233 |
| 2023/0005965 | A1* | 1/2023 | Lou | G09G 3/3266 |
| 2023/0031348 | A1* | 2/2023 | Zhang | G06F 3/0418 |
| 2023/0127878 | A1* | 4/2023 | Wang | G06F 3/0446 |
| | | | | 200/237 |

FOREIGN PATENT DOCUMENTS

| | | |
|---|---|---|
| CN | 108598139 A | 9/2018 |
| CN | 109541867 A | 3/2019 |
| CN | 109637372 A | 4/2019 |
| CN | 110176465 A | 8/2019 |
| CN | 110323257 A | 10/2019 |
| CN | 111146247 A | 5/2020 |
| CN | 111261032 A | 6/2020 |
| CN | 111862892 A | 10/2020 |
| CN | 111863876 A | 10/2020 |
| CN | 112038381 A | 12/2020 |
| CN | 112310163 A | 2/2021 |
| CN | 113160743 A | 7/2021 |
| CN | 113223409 A | 8/2021 |
| KR | 1020190041553 A | 4/2019 |
| KR | 1020210000799 A | 1/2021 |
| TW | 1696988 B | 6/2020 |

OTHER PUBLICATIONS

International Search Report issued on Feb. 10, 2022, in corresponding in International Application No. PCT/CN2021/129200, 7 pages.
Office Action issued on Feb. 7, 2022, in corresponding Chinese Application No. 202110206171.X, 11 pages.
Notice of Grant Issued on Jun. 17, 2022, in corresponding Chinese Application No. 202110206171.X, 6 pages.

* cited by examiner

ARRAY SUBSTRATE, DISPLAY PANEL AND DISPLAY DEVICE

CROSS-REFERENCE TO RELATED APPLICATIONS

This application is a continuation of International Application No. PCT/CN2021/129200, filed on Nov. 8, 2021, which claims priority to Chinese Patent Application No. 202110206171.X, entitled "Array substrate, display panel and display device", filed on Feb. 24, 2021, both of which are hereby incorporated by reference in their entireties.

TECHNICAL FIELD

The present application relates to the technical field of display, and in particular to an array substrate, a display panel and a display device.

BACKGROUND

With the rapid development of electronic devices, users have higher and higher requirements for screen-to-body ratio. Traditional electronic devices such as mobile phones and tablet computers need to integrate front-facing cameras, earpieces, and infrared sensing components. In the prior art, a notch or hole can be made on a display screen, and external light can enter a photosensitive component located below the screen through the notch or hole on the screen. Since signal lines around the notch or hole need to be connected in one-to-one correspondence, a large wiring space needs to be provided around the notch or hole, which affects the screen-to-body ratio of the display screen.

SUMMARY

Embodiments of the present application provide an array substrate, a display panel, and a display device.

In a first aspect, embodiments of the present application provides an array substrate including a hole area and a display area surrounding the hole area, wherein the array substrate includes: a plurality of pixel circuits distributed in an array in the display area; a plurality of first signal lines electrically connected to the pixel circuits and extending along a first direction, wherein the plurality of first signal lines include a plurality of first-type signal lines and a plurality of second-type signal lines, and each of the second-type signal lines includes a first segment and a second segment separated by the hole area; a plurality of first connection signal lines, wherein at least a number of the plurality of first connection signal lines is located in the display area, each of the first connection signal lines includes a first connection segment, a second connection segment and a third connection segment connected to each other, the first connection segment is electrically connected to the first segment, the third connection segment is electrically connected to the second segment, the second connection segment is connected between the first connection segment and the third connection segment, both the first connection segment and the third connection segment extend along a second direction, and the second connection segment extends along the first direction; a plurality of first compensation signal lines, wherein the plurality of first compensation signal lines are located in the display area, the plurality of first compensation signal lines include a plurality of first-type compensation signal lines and a plurality of second-type compensation signal lines, the first-type compensation signal lines extend along the first direction, and the second-type compensation signal lines extend along the second direction; wherein an orthographic projection of the first connection signal lines on a plane where the array substrate is located does not overlap with an orthographic projection of the pixel circuits on the plane, an orthographic projection of the first compensation signal lines on the plane does not overlap with the orthographic projection of the pixel circuits on the plane, the first-type compensation signal lines are configured to compensate an uneven density of the first connection signal lines in the display area in the first direction, and the second-type compensation signal lines are configured to compensate an uneven density of the first connection signal lines in the display area in the second direction.

In a second aspect, embodiments of the present application provides a display panel, including the array substrate as described in any embodiment of the first aspect.

In a third aspect, embodiments of the present application provides a display device, including the display panel as described in the second aspect.

BRIEF DESCRIPTION OF THE DRAWINGS

Other features, objects, and advantages of the present application will become more apparent from the following detailed description of non-limiting embodiments with reference to the accompanying drawings, wherein same or similar reference numbers refer to same or similar features, and the drawings are not drawn to an actual scale.

DETAILED DESCRIPTION

Features and exemplary embodiments of various aspects of the present application will be described in detail below, and in order to make the objects, technical solutions and advantages of the present application more apparent, detailed description of the present application will further be made in detail below in conjunction with the accompanying drawings and specific embodiments. It should be understood that the specific embodiments described herein are only configured to explain the present application, and are not configured to limit the present application. It will be apparent to one skilled in the art that the present application may be practiced without some of these specific details. The following description of the embodiments is merely provided to provide a better understanding of the present application by illustrating examples of the present application.

Figure 1:
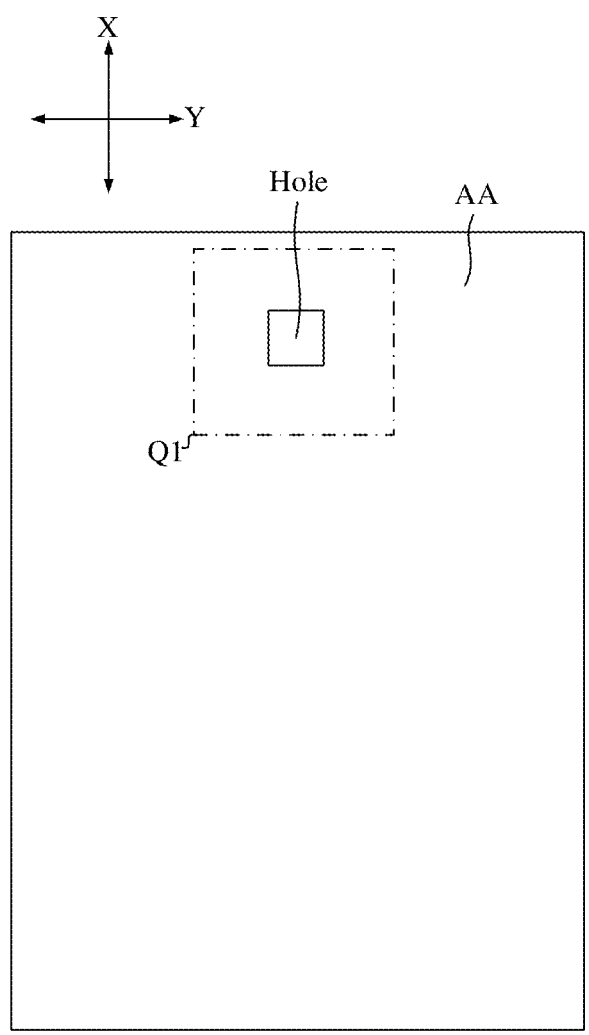
FIG. 1 illustrates a schematic top view of an array substrate provided by an embodiment of the present application.
Figure 2:
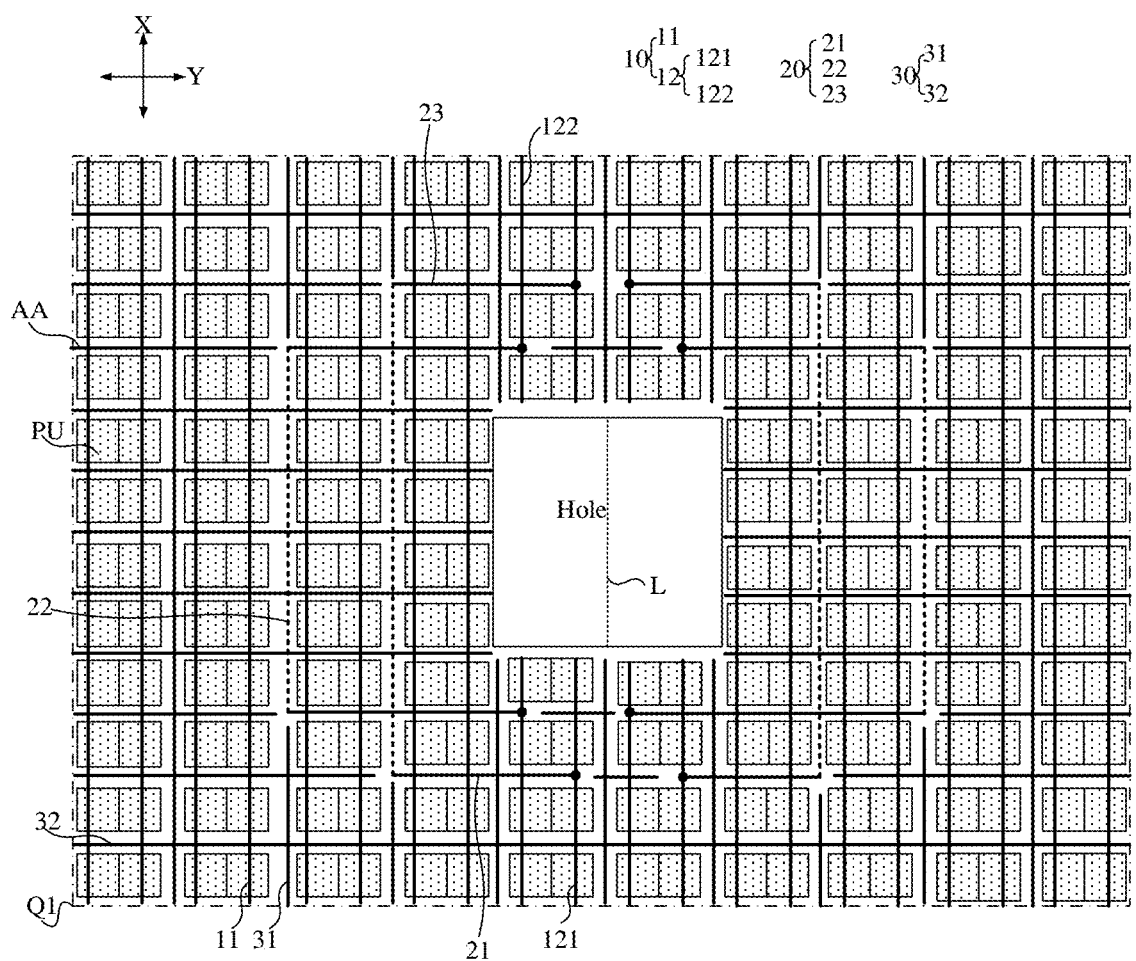
FIG. 2 illustrates an enlarged schematic diagram of Q1 area in FIG. 1.

FIG. 1 illustrates a schematic top view of an array substrate provided by an embodiment of the present application. FIG. 2 illustrates an enlarged schematic diagram of Q1 area in FIG. 1. As shown in FIG. 1 and FIG. 2, the embodiments of the present application provides an array substrate 100, which has a hole area Hole and a display area AA surrounding the hole area Hole.

Exemplarily, the hole area Hole may also be called an opening area, a notch area, a blind hole area, a through hole area, etc., which is not limited in the present application. The hole area Hole may be configured to place a photosensitive component. The photosensitive component may be an image acquisition device for acquiring external image information. For example, the photosensitive component is a camera or the like. The photosensitive component may not be limited to an image acquisition device. For example, in some embodiments, the photosensitive component may also be a light sensor such as an infrared sensor, a proximity sensor, an infrared lens, a flood sensing sensor, an ambient light sensor, and a dot matrix projector, etc.

The hole area Hole may be a rectangular area, a circular area, an elliptical area, or a square area, etc., and a shape of the hole area Hole may be set according to actual needs, which is not limited in the present application.

It can be understood that, the hole area Hole is a non-display area.

As shown in FIG. 1 and FIG. 2, the array substrate 100 includes pixel circuits PU, first signal lines 10, first connection signal lines 20 and first compensation signal lines 30.

A plurality of pixel circuits PU are distributed in an array in the display area AA. Exemplarily, the pixel circuits PU are configured to drive light-emitting elements to emit light.

In order to increase a pixel density of the display panel, a density of the pixel circuits on the array substrate 100 is also relatively high. Usually, the pixel circuits on the entire array substrate are arranged adjacent to each other, that is, there is not enough space between adjacent pixel circuits to place signal lines. However, in the embodiments of the present application, there are gaps between at least some adjacent pixel circuits PU. It can be understood that, under the condition of keeping the pixel density of the display panel unchanged, in the embodiments of the present application, it is equivalent to reducing a size of the pixel circuits PU as a whole, so that there are gaps between at least some adjacent pixel circuits PU, so that the signal lines can be placed at positions corresponding to the gaps.

First signal lines 10 are electrically connected to the pixel circuits PU and extend along a first direction X. It can be understood that the plurality of first signal lines 10 are all located in the display area AA. The plurality of first signal lines 10 include a plurality of first-type signal lines 11 and a plurality of second-type signal lines 12. Each first-type signal line 11 extends along the first direction X. Each second-type signal line 12 includes a first segment 121 and a second segment 122 separated by the hole area Hole and extending along the first direction X.

Exemplarily, an orthographic projection of the first signal lines 10 on a plane where the array substrate is located may overlap with an orthographic projection of the pixel circuits PU on the plane where the array substrate is located.

It can be understood that each first-type signal line 11 is a continuous wiring, and each first-type signal line 11 is not separated by the hole area Hole.

In order to provide signals to pixel driving circuits electrically connected to a same second-type signal line 12, the separated first segment 121 and second segment 122 may be connected by the first connection signal line 20.

At least a number of the plurality of first connection signal lines 20 are located in the display area AA. Each first connection signal line 20 includes a first connection segment 21, a second connection segment 22 and a third connection segment 23 connected to each other, the second connection segment 22 is connected between the first connection segment 21 and the third connection segment 23, the first connection segment 21 is electrically connected to the first segment 121 (the connection between the first connection segment 21 and the first segment 121 is indicated by a black dot in the figures), the third connection segment 23 is electrically connected to the second segment 122 (the connection between the third connection segment 23 and the second segment 122 is indicated by a black dot in the figures), and both the first connection segment 21 and the third connection segment 23 extend along a second direction Y. The second connection segment 22 extends along the first direction X. In order to clearly distinguish the first signal line 10 from the second connection segment 22, the second connection segment 22 is indicated by a dotted line in the figures.

An orthographic projection of the first connection signal lines 20 on the plane where the array substrate 100 is located does not overlap with the orthographic projection of the pixel circuits PU on the plane wherein the array substrate 100 is located. In the embodiments of the present application, by reducing the size of the pixel circuit PU, at least a portion of the pixel circuits PU are not adjacent to each other, that is to say, the gaps between at least a portion of the pixel circuits PU are increased, so that first connection signal lines 20 are disposed within the increased gaps.

The plurality of first compensation signal lines 30 includes a plurality of first-type compensation signal lines 31 and a plurality of second-type compensation signal lines 32, the first-type compensation signal lines 31 extend along the first direction X, and the second-type compensation signal lines 32 extend along the second direction Y. Moreover, an orthographic projection of the first compensation signal lines 30 on the plane where the array substrate 100 is located does not overlap with the orthographic projection of the pixel circuits PU on the plane where the array substrate 100 is located. That is to say, the first compensation signal lines 30 are also disposed at positions corresponding to the gaps between adjacent pixel circuits PU.

In the embodiments of the present application, since at least a portion of the first connection signal lines 20 are also arranged in the display area AA, a number of the first connection signal lines 20 arranged on a frame of the hole area Hole can be reduced, or even the first connection signal lines 20 may not be arranged on the frame of the hole area Hole, and thus an area of the frame of the hole area Hole can be reduced, and a screen-to-body ratio of the array substrate can be increased.

Figure 3:
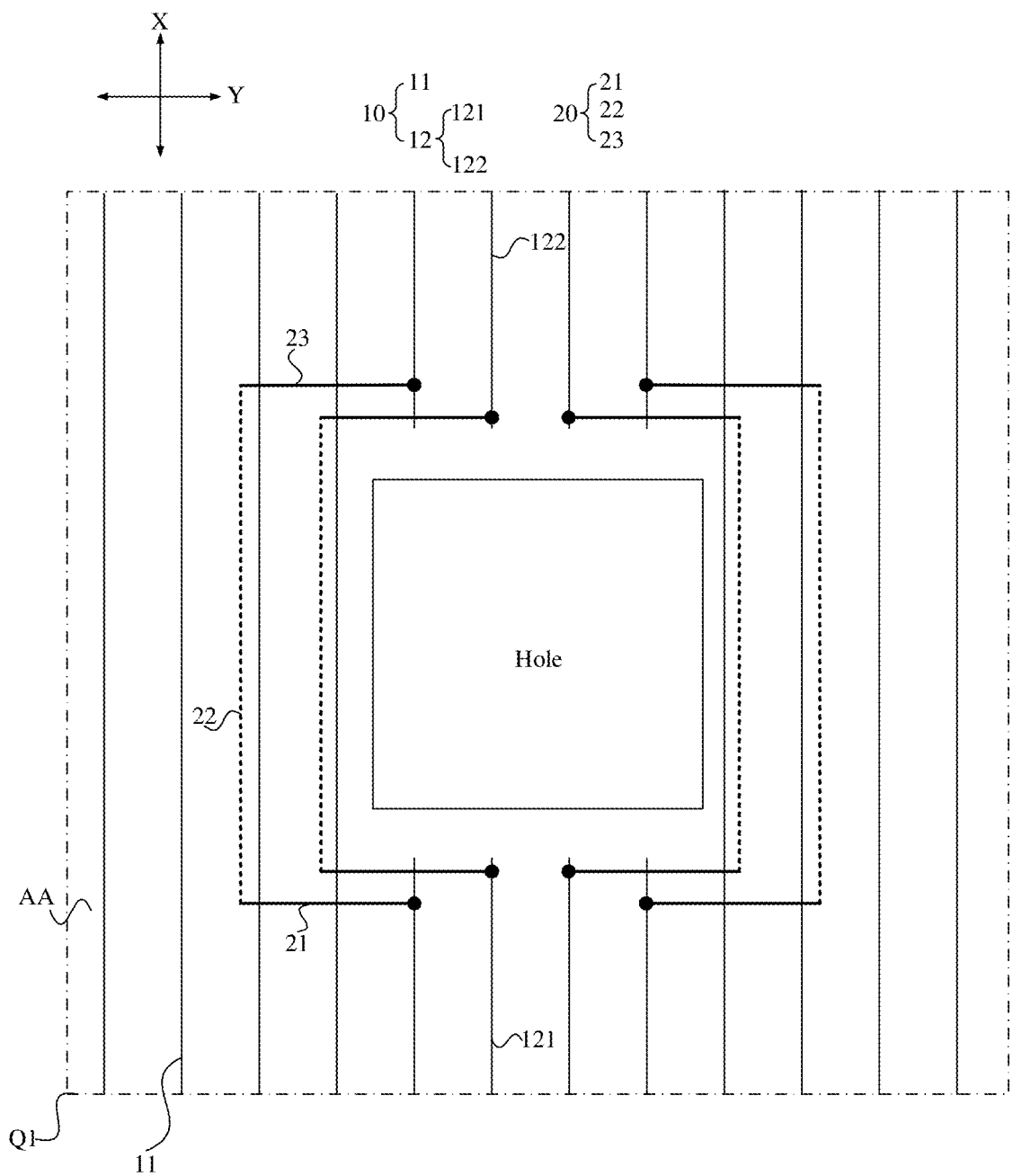
FIG. 3 illustrates an enlarged schematic diagram of a comparative example of the Q1 area in FIG. 1.

As shown in FIG. 3 (the pixel circuits are not shown in FIG. 3), since at least a portion of the first connection signal lines 20 are also arranged in the display area AA, a wiring density of a portion of the display area occupied by the first connection signal lines 20 is greater than a wiring density of other portions of the display area. Since wiring densities of different areas in the display area are different, there will be problems such as display unevenness (such as mura) under a condition that the array substrate drives light-emitting elements to display.

The array substrate provided by the embodiments of the present application further includes first compensation signal lines 30, the first compensation signal lines 30 are arranged in other areas of the display area AA except an area where the first connection signal lines 20 are located, and an extension direction of the first-type compensation signal lines 31 is the same as an extension direction of the second connection segment 22, the first-type compensation signal lines 31 are configured to compensate an uneven density of the first connection signal lines 20 in the display area AA in the first direction X, an extension direction of the second-type compensation signal lines 32 is the same as an extension direction of the first connection segment 21 and the third connection segment 23, the second-type compensation signal lines 32 are configured to compensate an uneven density of the first connection signal lines 20 in the display area AA in the second direction Y, so that wiring densities of the entire display area AA tend to be consistent, thereby improving the problem of display unevenness (such as mura). In addition, orthographic projections of the first connection signal lines 20 and the first compensation signal lines 30 on the plane where the array substrate is located do not overlap with the orthographic projection of the pixel circuits PU on the plane where the array substrate is located, which reduces a possibility of forming a parasitic capacitance between the first connection signal lines 20 and the first compensation signal lines 30 and the pixel circuits PU, so that a coupling effect between the first connection signal lines 20 and the first compensation signal lines 30 and the pixel circuits PU can be reduced, thereby improving the display effect.

Exemplarily, the first direction X and the second direction Y intersect. The first direction X and the second direction Y may be perpendicular. For example, the first direction X may be a column direction, the second direction Y may be a row direction, and the first signal lines 10 may be data signal lines. For another example, the first direction X may be a row direction, the second direction Y may be a column direction, and the first signal lines 10 may be scanning signal lines or light-emitting control signal lines or reference voltage signal lines, which is not limited in the present application.

In some optional embodiments, in the second direction Y, a line spacing between adjacent first-type compensation signal lines 31 is equal to a line spacing between adjacent second connection segments 22. A line width of each of the first-type compensation signal lines 31 is equal to a line width of the second connection segment 22. That is to say, the plurality of second connection segments 22 and the plurality of first-type compensation signal lines 31 are evenly distributed in the second direction Y. Since both the first-type compensation signal lines 31 and the second connection segments 22 extend along the first direction X, have equal line widths and are evenly distributed, the wiring densities of the entire display area AA in the first direction X can further tend to be consistent.

Exemplarily, in the second direction Y, a line spacing between the first-type compensation signal line 31 and the second connection segment 22 immediately adjacent to the first-type compensation signal line 31 is equal to the line spacing between adjacent first-type compensation signal lines 31, and the line spacing between the first-type compensation signal line 31 and the second connection segment 22 immediately adjacent to the first-type compensation signal line 31 is equal to the line spacing between adjacent second connection segments 22.

Exemplarily, the second connection segment 22 is on extension lines of a portion of the first-type compensation signal lines 31, or in other words, two first-type compensation signal lines 31 are provided at both ends of the second connection segment 22 in the first direction X, the extension lines of the two first-type compensation signal lines 31 pass through the second connection segment 22.

In some other optional embodiments, in the first direction X, a line spacing between adjacent second-type compensation signal lines 32, a line spacing between adjacent first connection segments 21, and a line spacing between adjacent third connection segments 23 are equal, and a line width of each of the second-type compensation signal lines 32, a line width of the first connection segment 21 and a line width of the third connection segment 22 are equal. That is to say, the plurality of second-type compensation signal lines 32, the plurality of first connection segments 21 and the plurality of third connection segments 23 are evenly distributed in the first direction X. Since the second-type compensation signal lines 32, the first connection segments 21 and the third connection segments 23 all extend along the second direction Y, have equal line widths and are evenly distributed, the wiring densities of the entire display area AA in the second direction Y can further tend to be consistent.

Exemplarily, in the first direction X, a line spacing between the second-type compensation signal line 32 and the first connection segment 21 immediately adjacent to the second-type compensation signal line 32 is equal to a line spacing between adjacent second-type compensation signal lines 32, and a line spacing between the second-type compensation signal line 32 and the first connection segment 21 immediately adjacent to the second-type compensation signal line 32 is equal to a line spacing between adjacent first connection segments 21; in the first direction X, a line spacing between the second-type compensation signal line 32 and the third connection segment 23 immediately adjacent to the second-type compensation signal line 32 is equal to a line spacing between adjacent second-type compensation signal lines 32, and a line spacing between the second-type compensation signal line 32 and the third connection segment 23 immediately adjacent to the second-type compensation signal line 32 is equal to a line spacing between adjacent third connection segments 23.

Exemplarily, the first connection segment 21 and the third connection segment 23 are on extension lines of a portion of the second-type compensation signal lines 32, or in other words, two second-type compensation signal lines 32 are arranged at both ends of the first connection segment 21 and the third connection segment 23 in the second direction Y, and the extension lines of the two second-type compensation signal lines 32 pass through the first connection segment 21 and the third connection segment 23.

If the first compensation signal lines 30 are not connected to other signal lines, a parasitic capacitance will be generated between the first compensation signal lines 30 and other signal lines, which will affect the signal stability, thereby affecting the display stability.

Figure 4:
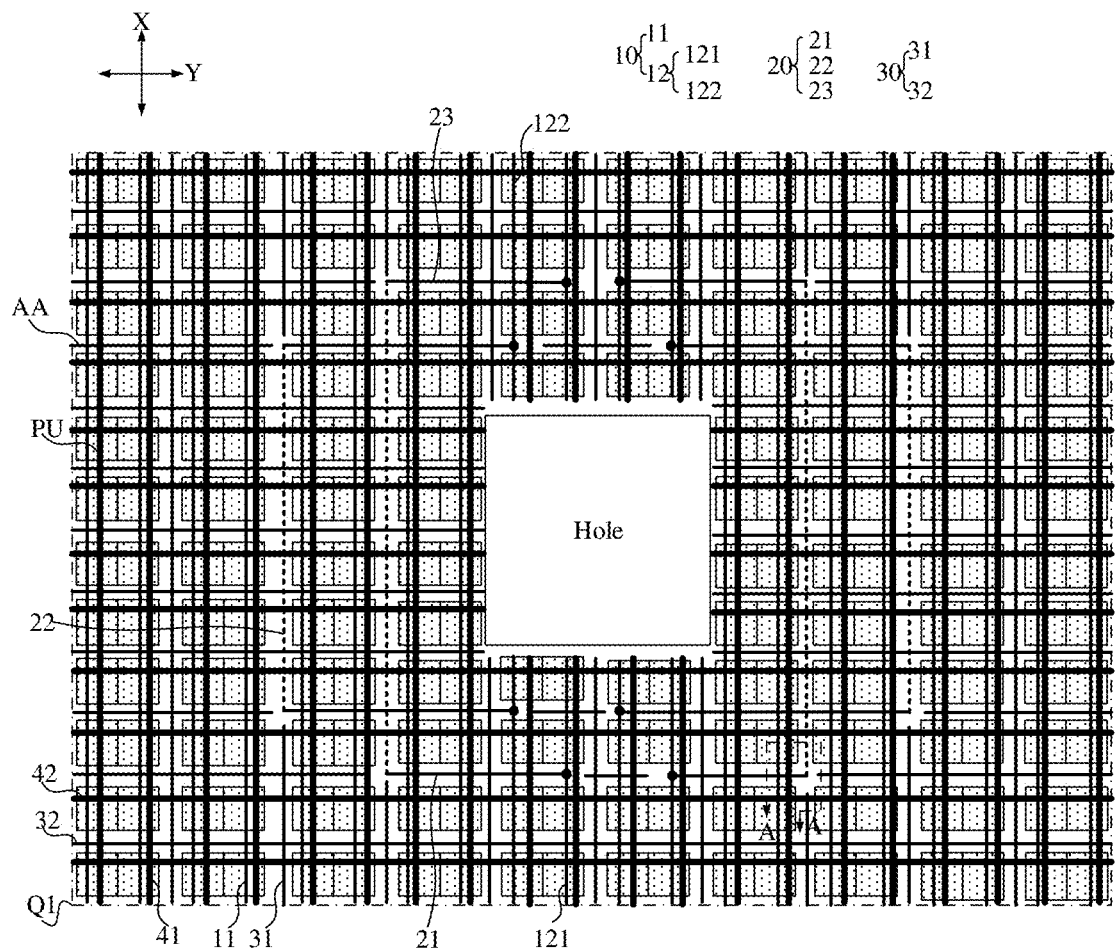
FIG. 4 illustrates another enlarged schematic diagram of the Q1 area in FIG. 1.

In some optional embodiments, as shown in FIG. 4, the array substrate 100 may further include a plurality of first fixed voltage signal lines 41 and a plurality of second fixed voltage signal lines 42. The plurality of first fixed voltage signal lines 41 are electrically connected to the pixel circuits PU and extend along the first direction X. The first-type compensation signal lines 31 are electrically connected to the second fixed voltage signal lines 42, and the second-type compensation signal lines 32 are electrically connected to the first fixed voltage signal lines 41.

Exemplarily, an orthographic projection of the first fixed voltage signal lines 41 on the plane where the array substrate is located overlaps with the orthographic projection of the pixel circuits PU on the plane where the array substrate is located. The plurality of second fixed voltage signal lines 42 are electrically connected to the pixel circuits PU and extend along the second direction Y.

Exemplarily, an orthographic projection of the second fixed voltage signal lines 42 on the plane where the array substrate is located overlaps with the orthographic projection of the pixel circuits PU on the plane where the array substrate is located.

For example, the first direction X may be a column direction, the second direction Y may be a row direction, the first fixed voltage signal lines 41 may be power signal lines (Vdd line), and the second fixed voltage signal lines 42 may be reference voltage signal lines (Vref line). For another example, the first direction X may be a row direction, the second direction Y may be a column direction, the first fixed voltage signal lines 41 may be reference voltage signal lines, and the second fixed voltage signal lines 42 may be power signal lines. The present application is not limited to this.

According to the embodiments of the present application, the second-type compensation signal lines 32 are electrically connected to the first fixed voltage signal lines 41. On one hand, this can prevent the second-type compensation signal lines 32 from forming a parasitic capacitance and improve display stability; on the other hand, the first fixed voltage signal lines 41 extend along the first direction X, and the second-type compensation signal lines 32 extend along the second direction Y, which is equivalent to forming grid-shaped first fixed voltage signal lines 41, thereby increasing a wiring area of the first fixed voltage signal lines 41, and thus a resistance of the first fixed voltage signal lines 41 can be reduced, thereby reducing a voltage drop (IR drop) of the first fixed voltage signal lines 41. Similarly, the first-type compensation signal lines 31 are electrically connected to the second fixed voltage signal lines 42. On one hand, this can prevent the first-type compensation signal lines 31 from forming a parasitic capacitance and improve display stability; on the other hand, the second fixed voltage signal lines 42 extend along the second direction Y, and the first-type compensation signal lines 31 extend along the first direction X, which is equivalent to forming grid-shaped second fixed voltage signal lines 42, thereby increasing a wiring area of the second fixed voltage signal lines 42, and thus a resistance of the second fixed voltage signal lines 42 can be reduced, thereby reducing a voltage drop (IR drop) of the second fixed voltage signal lines 42.

Figure 5:
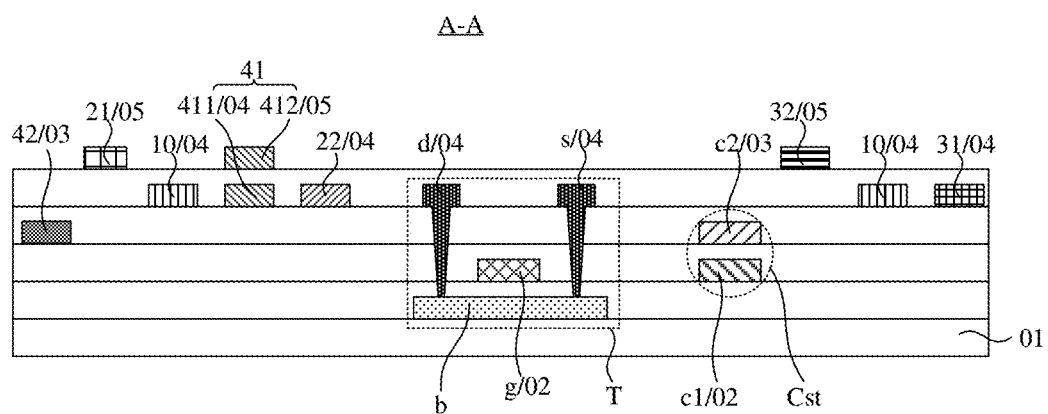
FIG. 5 illustrates a schematic cross-sectional view of A-A direction in FIG. 4.

In some optional embodiments, as shown in FIG. 5, the first fixed voltage signal lines 41 and the second fixed voltage signal lines 42 are located in different film layers, the second connection segment 22, the first-type compensation signal lines 31 and the first signal lines 10 are arranged to be in a same layer and have a same material, and the first connection segment 21, the third connection segment 23, and the second-type compensation signal lines 32 are arranged to be in a same layer and have a same material. In this way, signal interference can be avoided, and the second connection segment 22, the first-type compensation signal lines 31 and the first signal lines 10 are simultaneously formed in a same process step, and the first connection segment 21, the third connection segment 23 and the second-type compensation signal lines 32 are simultaneously formed in a same process step.

Exemplarily, the array substrate 100 may include a substrate 01 and a first conductive layer 02, a second conductive layer 03, a third conductive layer 04 and a fourth conductive layer 05 disposed on one side of the substrate 01 and arranged in a stack. An insulation layer is arranged between adjacent conductive layers. Exemplarily, each pixel circuit PU include a transistor T and a storage capacitor Cst. The transistor T includes a semiconductor b, a gate g, a source s and a drain d. The storage capacitor Cst includes a first plate c1 and a second plate c2. As an example, the gate g and the first plate c1 may be located in the first conductive layer 02, the second plate c2 and the second fixed voltage signal line 42 may be located in the second conductive layer 03, the source s, the drain d, the first signal line 10, the second connection segment 22 and the first-type compensation signal line 31 may be located in the third conductive layer 04, the first connection segment 21, the third connection segment 23 (not shown in the figures) and the second-type compensation signal line 32 may all be located in the fourth conductive layer 05. The first connection segment 21 and the third connection segment 23 may be connected to the second connection segment 22 through via holes.

Exemplarily, as shown in FIG. 5, the first fixed voltage signal line 41 may include a first sub-fixed voltage signal line 411 and a second sub-fixed voltage signal line 412 arranged in a stack to further reduce the voltage drop of the first fixed voltage signal line 41. The first sub-fixed voltage signal line 411 may be located in the third conductive layer 04, and the second sub-fixed voltage signal line 412 may be located in the fourth conductive layer 05.

In order to clearly show each wiring, the transistor T and the storage capacitor Cst, the first signal line 10, the first fixed voltage signal line 41 and the second fixed voltage signal line 42 are not shown to overlap with the transistor T or the storage capacitor Cst, which is not intended to limit the present application.

In some optional embodiments, as shown in FIG. 2, the hole area Hole has a centerline L in the second direction Y, the smaller a vertical distance in the second direction Y between each of the second-type signal lines 12 and the centerline Y, the smaller a vertical distance in the second direction Y between the centerline L and the second connection segment 22 electrically connected to the second-type signal line 12, and the smaller a vertical distance in the second direction Y between each of the second-type signal lines 12 and the centerline L, the smaller a vertical distance in the second direction Y between the centerline L and the first connection segment 21 electrically connected to the second-type signal line 12 and a vertical distance in the second direction Y between the centerline L and the third connection segment 23 electrically connected to the second-type signal line 12.

Take an innermost second-type signal line 12 and an outermost second-type signal line 12 among the plurality of second-type signal lines 12 facing the hole area Hole as an example, wherein a vertical distance in the second direction Y between the center line L and the innermost second-type signal line 12 among the plurality of second-type signal lines 12 facing the hole area Hole is the smallest, and a vertical distance in the second direction Y between the center line L and the outermost second-type signal line 12 among the plurality of second-type signal lines 12 facing the hole area Hole is the largest.

The second connection segment 22 corresponding to the innermost second-type signal line 12 is arranged on the innermost side, and the first connection segment 21 and the third connection segment 23 corresponding to the innermost second-type signal line 12 are arranged on the outermost side. The second connection segment 22 corresponding to the outermost second-type signal line 12 is arranged on the outermost side, and the first connection segment 21 and the third connection segment 23 corresponding to the outermost second-type signal line 12 are arranged on the innermost side.

It can be understood that lengths of the first connection segment 21 and the third connection segment 23 of a same first connection signal line 20 are equal.

The above arrangement can make the length of the second connection segment 22 corresponding to the innermost second-type signal line 12 longer than the length of the second connection segment 22 corresponding to the outermost second-type signal line 12, and make lengths of the first connection segment 21 and the third connection segment 23 corresponding to the innermost second-type signal line 12 shorter than lengths of the first connection segment 21 and the third connection segment 23 corresponding to the outermost second-type signal line 12, so that a total length of the first connection signal line 20 corresponding to the innermost second-type signal line 12 and a total length of the first connection signal line 20 corresponding to the outermost second-type signal line 12 tend to be consistent, and thus resistances of various first connection signal lines 20 tend to be consistent, that is, to make voltage drops of various first connection signal lines 20 tend to be consistent, which is beneficial for display uniformity.

In some optional embodiments, the first connection signal lines 20 may be evenly distributed in the display area AA. For example, in the second direction Y, the line spacing between adjacent second connection segments 22 is the same. In the first direction X, the line spacing between adjacent first connection segments 21 is the same, and the line spacing between adjacent third connection segments 23 is the same.

In some optional embodiments, the plurality of second connection segments 22 may be evenly distributed on both sides of the hole area Hole in the second direction Y.

Exemplarily, as shown in FIG. 2, a number of pixel circuits PU arranged along the second direction Y in an interval between every two adjacent second connection segments 22 on a same side of the hole area Hole is equal, so that the line spacing in the second direction Y between adjacent second connection segments 22 is the same. A number of pixel circuits PU arranged along the first direction X in an interval between every two adjacent first connection segments 21 on a same side of the hole area Hole is equal, so that the line spacing in the first direction X between adjacent first connection segments 21 is the same. A number of pixel circuits PU arranged along the first direction X in an interval between every two adjacent third connection segments 23 on a same side of the hole area Hole is equal, so that the line spacing in the first direction X between adjacent third connection segments 23 is the same. In addition, a number of pixel circuits PU arranged along the first direction X in an interval between adjacent first connection segments 21 is equal to a number of pixel circuits PU arranged along the first direction X in an interval between adjacent third connection segments 23, so that the line spacing in the first direction X between adjacent first connection segments 21 is the same as the line spacing in the first direction X between adjacent third connection segments 23.

Further, on a same side of the hole area Hole, a number of pixel circuits PU arranged along the second direction Y in an interval between adjacent second connection segments 22 is twice a number of pixel circuits PU arranged along the first direction X in an interval between adjacent first connection segments 21. Since the number of pixel circuits PU arranged along the first direction X in the interval between adjacent first connection segments 21 on a same side of the hole area Hole is equal to the number of pixel circuits PU arranged along the first direction X in the interval between adjacent third connection segments 23 on a same side of the hole area Hole, therefore on a same side of the hole area Hole, the number of pixel circuits PU arranged along the second direction Y in the interval between adjacent second connection segments 22 is also twice the number of pixel circuits PU arranged along the first direction X in the interval between adjacent third connection segments 23.

For example, as shown in FIG. 2, the number of pixel circuits PU arranged along the second direction Y in the interval between adjacent second connection segments 22 on a same side of the hole area Hole is two, the number of pixel circuits PU arranged along the first direction X in the interval between adjacent first connection segments 21 on a same side of the hole area Hole is one, and the number of pixel circuits PU arranged along the first direction X in the interval between adjacent third connection segments 23 on a same side of the hole area Hole is one. Taking two first connection signal lines 20 corresponding to two adjacent second-type signal lines 12 on a same side of the center line L of the hole area Hole as an example, a length of the second connection segment 22 closer to the center line L is roughly two pixel circuits PU longer than a length of the second connection segment 22 farther from the center line L, a length of the first connection segment 21 closer to the center line L is roughly one pixel circuit PU shorter than a length of the first connection segment 21 farther from the center line L, a length of the third connection segment 23 closer to the center line L is roughly one pixel circuit PU shorter than a length of the third connection segment 23 farther from the center line L. Therefore, it is further ensured that the total lengths of two first connection signal lines 20 corresponding to two adjacent second-type signal lines 12 on a same side of the central line L of the hole area Hole are equal.

The number of pixel circuits PU arranged along the second direction Y in the interval between adjacent second connection segments 22 on a same side of the hole area Hole being two is only an example, and the number of pixel circuits PU along the second direction Y in the interval between adjacent second connection segments 22 on a same side of the hole area Hole may be four, six, eight, etc., which is not limited in the present application. Exemplarily, the number of pixel circuits PU arranged along the second direction Y in the interval between adjacent second connection segments 22 on a same side of the hole area Hole may be an even number.

In some optional embodiments, a plurality of pixel circuits PU arranged along the second direction Y in the interval between adjacent second connection segments 22 may be arranged to be immediately adjacent to each other. In this way, under a condition that the size of the pixel circuit PU is constant, the gap between adjacent pixel circuits PU can be increased; under a condition that the line width of the first connection signal line 20 is constant, it is possible to ensure that the first connection signal line 20 can be placed in the gap between adjacent pixel circuits PU without setting the size of the pixel circuit PU too small.

In some optional embodiments, as shown in FIG. 1 and FIG. 2, the first direction X may be a column direction, the second direction Y may be a row direction, and the first signal lines 10 may be data signal lines.

Figure 6:
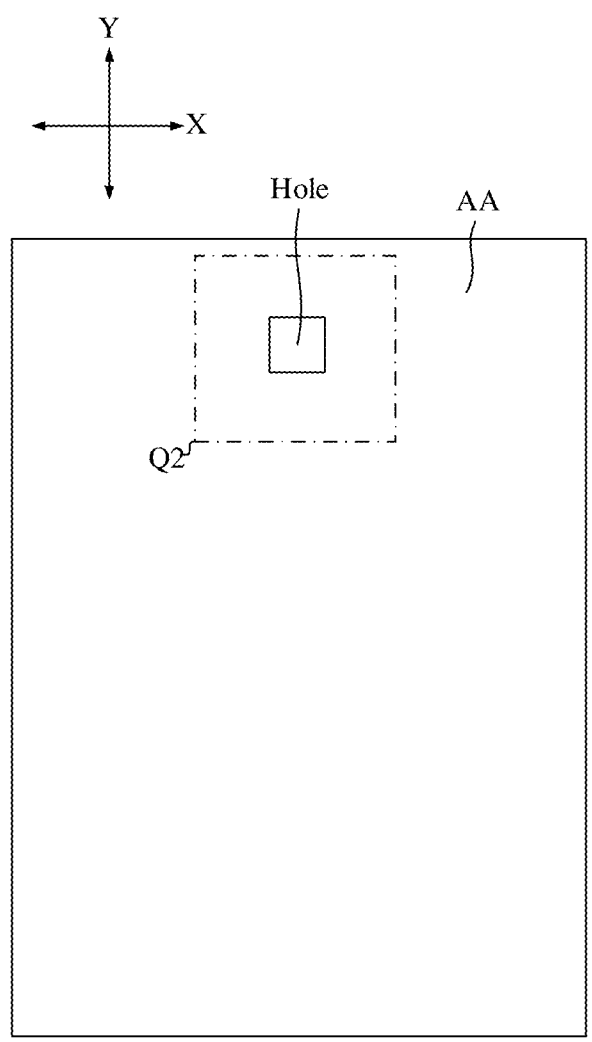
FIG. 6 illustrates another schematic top view of an array substrate provided by an embodiment of the present application.
Figure 7:
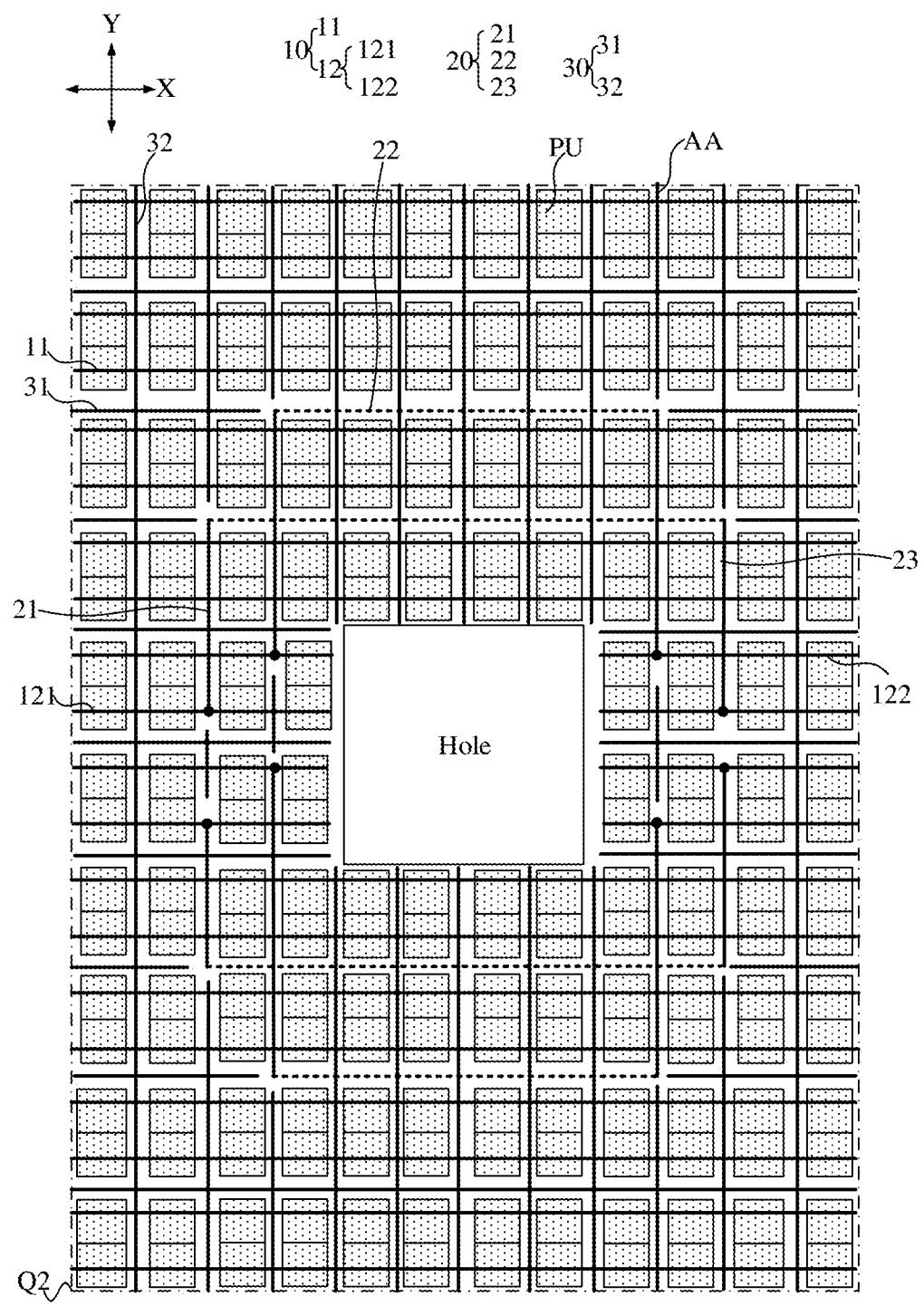
FIG. 7 illustrates an enlarged schematic diagram of Q2 area in FIG. 6.

In other optional embodiments, as shown in FIG. 6 and FIG. 7, the first direction X may be the row direction, the second direction Y may be the column direction, and the first signal lines 10 may be scanning signal lines or light-emitting control signal lines or reference voltage signal lines.

Figure 8:
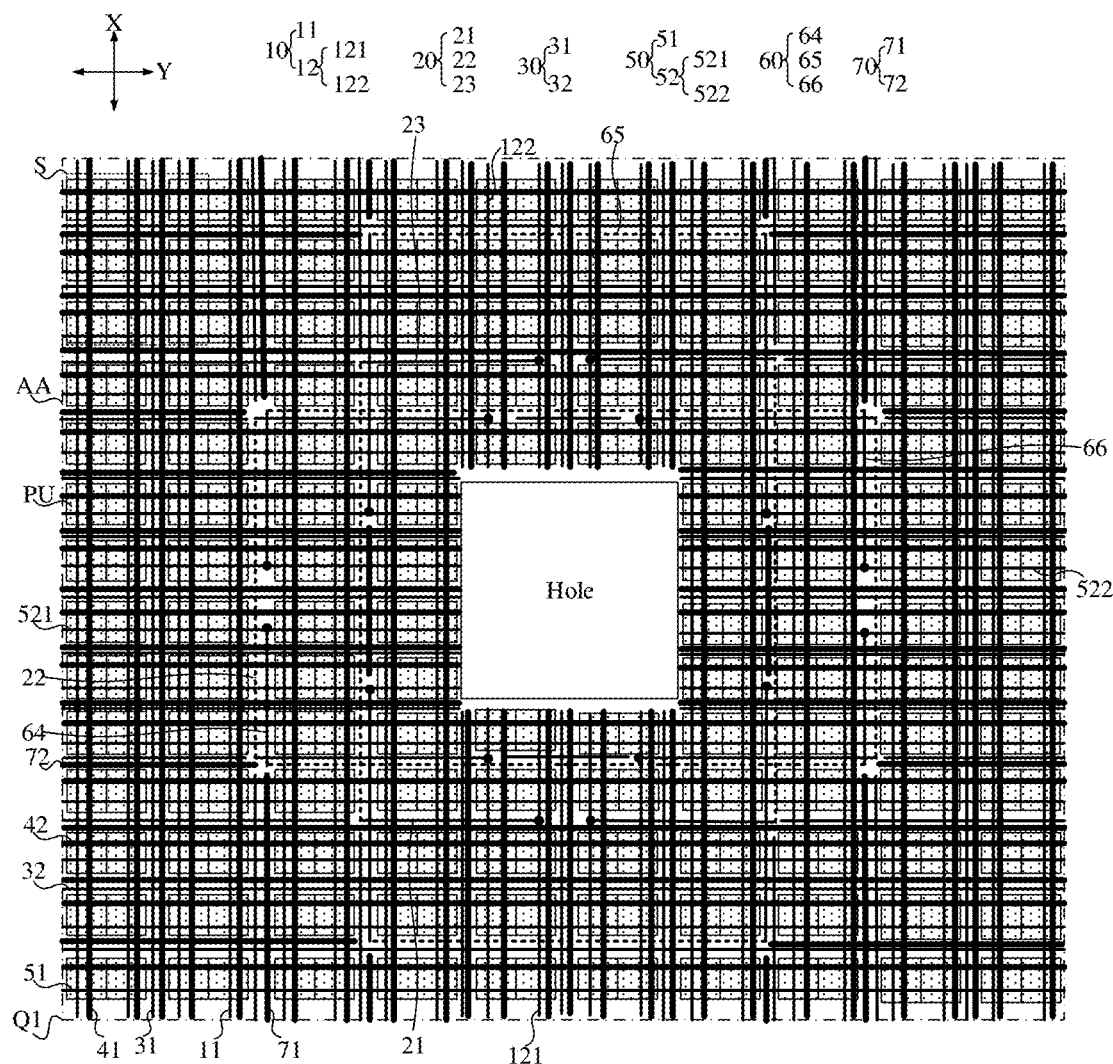
FIG. 8 illustrates another enlarged schematic diagram of the Q1 area in FIG. 1.
Figure 9:
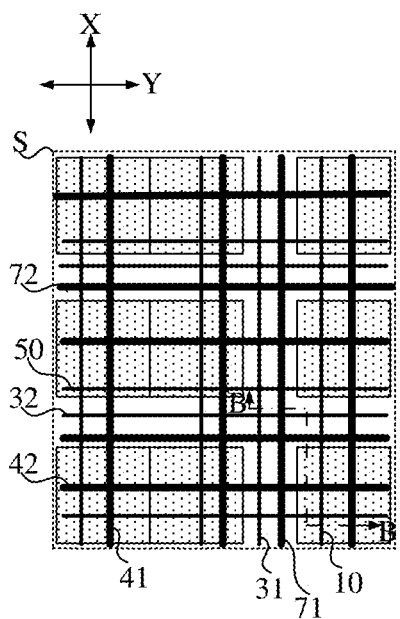
FIG. 9 illustrates an enlarged schematic diagram of S area in FIG. 8.

In some optional embodiments, as shown in FIG. 1, FIG. 8 and FIG. 9, the first direction X is the column direction, the second direction Y is the row direction, the first signal lines 10 are data signal lines, and the array substrate 100 further includes a plurality of second signal lines 50, a plurality of second connection signal lines 60 and a plurality of second compensation signal lines 70.

The second signal lines 50 are scanning signal lines or light-emitting control signal lines or reference voltage signal lines. The second signal lines 50 are electrically connected to the pixel circuits PU and extend along the second direction Y. It can be understood that the plurality of second signal lines 50 are all located in the display area AA. The plurality of second signal lines 50 include a plurality of third-type signal lines 51 and a plurality of fourth-type signal lines 52, each of the fourth-type signal lines 52 includes a third segment 521 and a fourth segment 522 separated by the hole area Hole.

Exemplarily, an orthographic projection of the second signal lines 50 on the plane where the array substrate is located may overlap with the orthographic projection of the pixel circuits PU on the plane where the array substrate is located.

It can be understood that each third-type signal line 51 is a continuous wiring, and each third-type signal line 51 is not separated by the hole area Hole.

In order to provide signals to the pixel circuits electrically connected to a same fourth-type signal line 52, the separated third segment 521 and fourth segment 522 may be connected by the second connection signal line 60.

At least a number of the plurality of second connection signal lines 60 are located in the display area AA. Each second connection signal line 60 includes a fourth connection segment 64, a fifth connection segment 65 and a sixth connection segment 66 connected to each other, and the fourth connection segment 64 is electrically connected to the third segment 521 (the connection between the fourth connection segment 64 and the third segment 521 is indicated by a black dot in the figures), the sixth connection segment 66 is electrically connected to the fourth segment 522 (the connection between the sixth connection segment 66 and the fourth segment 522 is indicated by a black dot in the figures), the fifth connection segment 65 is connected between the fourth connection segment 64 and the sixth connection segment 66, both the fourth connection segment 64 and the sixth connection segment 66 extend along the first direction X, and the fifth connection segment 65 extends along the second direction Y. In order to clearly distinguish the second signal line 50 from the fifth connection segment 65, the fifth connection segment 65 is indicated by a dotted line in the figures.

An orthographic projection of the second connection signal lines 60 on the plane where the array substrate is located does not overlap with an orthographic projection of the pixel circuits PU on the plane where the array substrate is located. In the embodiments of the present application, by reducing the size of the pixel circuit PU, at least a portion of the pixel circuits PU are not adjacent to each other, that is to say, the gaps between at least a portion of the pixel circuits PU are increased, so that second connection signal lines 60 are disposed within the increased gaps.

The plurality of second compensation signal lines 70 includes a plurality of third-type compensation signal lines 71 and a plurality of fourth-type compensation signal lines 72, the third-type compensation signal lines 71 extend along the first direction X, the third-type compensation signal lines 71 are configured to compensate an uneven density of the second-type connection signal lines 60 in the display area AA in the first direction X, the fourth-type compensation signal lines 72 extend along the second direction Y, and the fourth-type compensation signal lines 72 are configured to compensate an uneven density of the second connection signal lines 60 in the display area AA in the second direction Y. Moreover, an orthographic projection of the second compensation signal lines 70 on the plane where the array substrate 100 is located does not overlap with the orthographic projection of the pixel circuits PU on the plane where the array substrate 100 is located. That is to say, the second compensation signal lines 70 are also disposed at positions corresponding to the gaps between adjacent pixel circuits PU.

In the embodiments of the present application, since at least a portion of the second connection signal lines 60 are also arranged in the display area AA, a number of the second connection signal lines 60 arranged on the frame of the hole area Hole can be reduced, or even the second connection signal lines 60 may not be arranged on the frame of the hole area Hole, and thus the area of the frame of the hole area Hole can be reduced, and the screen-to-body ratio of the array substrate can be increased.

Similarly, since at least a portion of the second connection signal lines 60 are also arranged in the display area AA, a wiring density of a portion of the display area occupied by the second connection signal lines 60 is greater than that a wiring density of other portions of the display areas. Since wiring densities of different areas in the display area are different, there will be problems such as display unevenness (such as mura) under a condition that the array substrate drives light-emitting elements to display.

The array substrate provided by the embodiments of the present application further includes second compensation signal lines 70, the second compensation signal lines 70 are arranged in other areas of the display area AA except an area where the second connection signal lines 60 are located, and an extension direction of the third-type compensation signal lines 71 is the same as an extension direction of the fourth connection segment 64 and the sixth connection segment 66, the third-type compensation signal lines 71 are configured to compensate an uneven density of the second-type connection signal lines 60 in the display area AA in the first direction X, an extension direction of the fourth-type compensation signal line 72 is the same as an extension direction of the fifth connection segment 65, the fourth-type compensation signal lines 72 are configured to compensate an uneven density of the second connection signal lines 60 in the display area AA in the second direction Y, so that wiring densities of the entire display area AA tend to be consistent, thereby improving the problem of display unevenness (such as mura). In addition, orthographic projections of the second connection signal lines 60 and the second compensation signal lines 70 on the plane where the array substrate is located do not overlap with the orthographic projection of the pixel circuits on the plane where the array substrate is located, which reduces a possibility of forming a parasitic capacitance between the second connection signal lines 60 and the second compensation signal lines 70 and the pixel circuits PU, so that a coupling effect between the second connection signal lines 60 and the second compensation signal lines 70 and the pixel circuits PU can be reduced, thereby improving the display effect.

The second connection signal lines 60 may be arranged according to the method of arranging the first connection signal lines 20 in the above-mentioned embodiments, and the second compensation signal lines 70 may be arranged according to the method of arranging the first compensation signal lines 30 in the above-mentioned embodiments, which will not be repeated herein.

Exemplarily, the third-type compensation signal lines 71 may be electrically connected to the second fixed voltage signal lines 42, so as to prevent the third-type compensation signal lines 71 from forming a parasitic capacitance and further reduce the voltage drop of the second fixed voltage signal lines 42. The fourth-type compensation signal lines 72 may be electrically connected to the first fixed voltage signal lines 41, so as to prevent the fourth-type compensation signal lines 72 from forming a parasitic capacitance and further reduce the voltage drop of the first fixed voltage signal lines 41.

Figure 10:
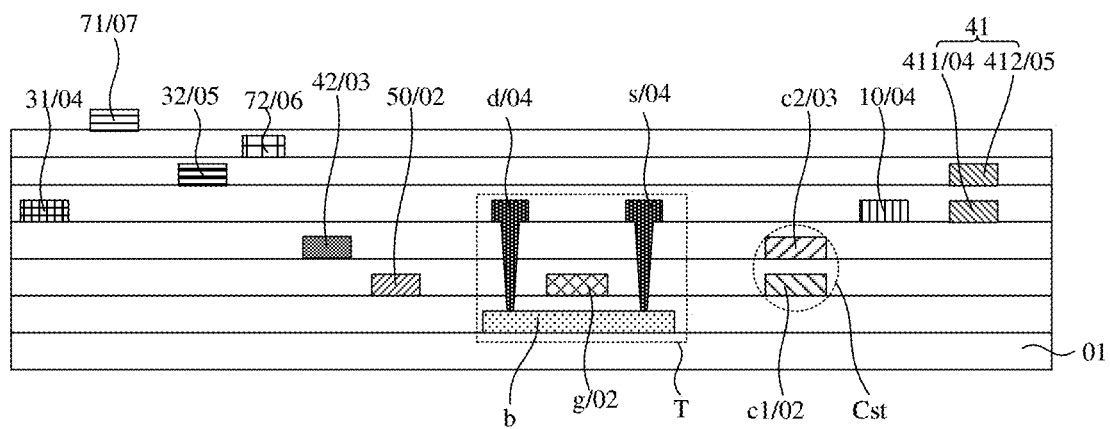
FIG. 10 illustrates a schematic cross-sectional view of B-B direction in FIG. 8.

As an example, as shown in FIG. 10, the array substrate 100 may further include a fifth conductive layer 06 and a sixth conductive layer 07. An insulation layer is arranged between adjacent conductive layers.

The second signal line 50 may be located in the first conductive layer 02, the second fixed voltage signal line 42 may be located in the second conductive layer 03, the first signal line 10, the second connection segment 22 (not shown in FIG. 10) and the first-type compensation signal line 31 may be located in the third conductive layer 04, the first connection segment 21 (not shown in FIG. 10), the third connection segment 23 (not shown in FIG. 10) and the second-type compensation signal line 32 may all be located in the fourth conductive layer 05, the fourth-type compensation signal line 72 may be located in the fifth conductive layer 06, and the third-type compensation signal line 71 may be located in the sixth conductive layer 07.

Figure 11:
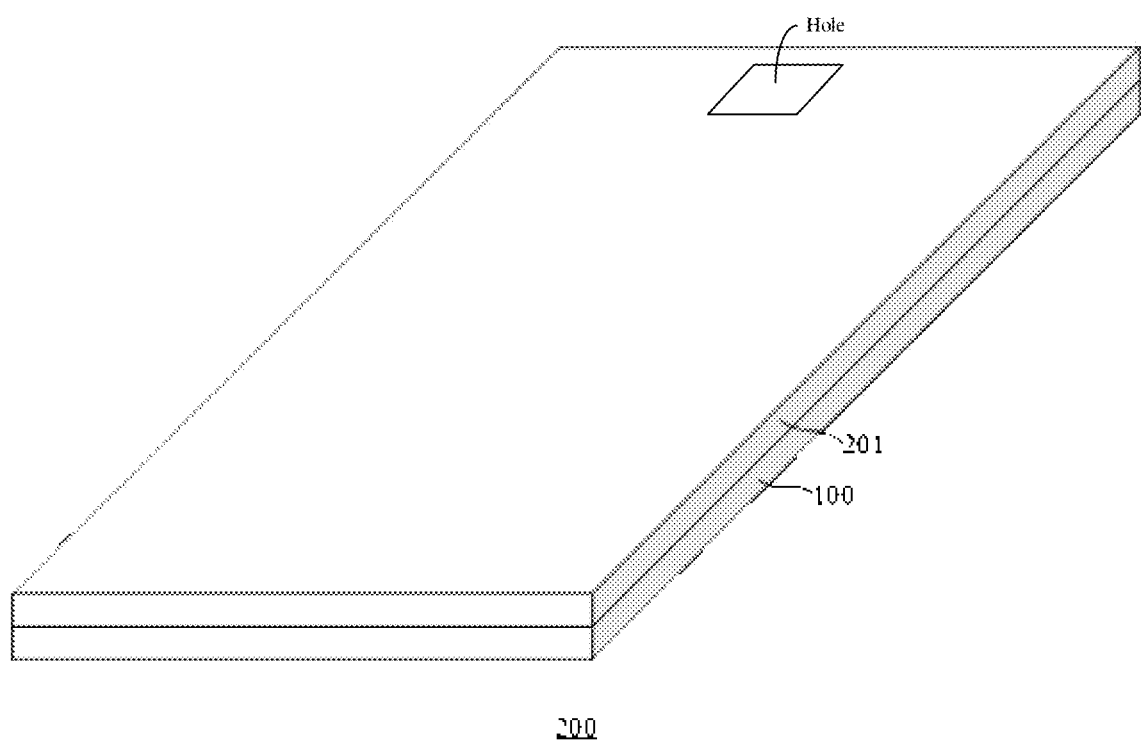
FIG. 11 illustrates a schematic structural diagram of a display panel provided by an embodiment of the present application.

The embodiments of the present application further provide a display panel, including the array substrate as described in any one of the above embodiments. FIG. 11 illustrates a schematic structural diagram of a display panel provided by an embodiment of the present application. As shown in FIG. 11, the display panel 200 includes the array substrate 100 as described in any one of the above embodiments and a light-emitting layer 201 on the array substrate 100. Exemplarily, the light-emitting layer 201 may be an organic light emitting layer, that is, the display panel 200 may be an Organic Light Emitting Diode (OLED) display panel.

The problem-solving principle of the display panel is similar to that of the array substrate mentioned above, so the implementation of the display panel can refer to the implementations of the array substrate mentioned above, which will not be repeated herein.

The embodiments of the present application further provide a display device, including the display panel 200 as described in the above embodiments. The display device may be any electronic device with a display function such as a mobile phone, a tablet computer, a notebook computer, an electronic paper book, or a television, etc.

In accordance with the embodiments of the present application as described herein, these embodiments do not describe all details in detail, nor do they limit the application to only the specific embodiments described. Obviously, many modifications and variations are possible in light of the above description. This description selects and specifically describes these embodiments in order to better explain the principles and practical applications of the present application, so that those skilled in the art can make good use of the present application and its modifications based on the present application. The present application is to be limited only by the claims, along with their full scope and equivalents.

What is claimed is:

1. An array substrate comprising a hole area and a display area surrounding the hole area, wherein the array substrate comprises:
   a plurality of pixel circuits distributed in an array in the display area;
   a plurality of first signal lines electrically connected to the pixel circuits and extending along a first direction, wherein the plurality of first signal lines comprise a plurality of first-type signal lines and a plurality of second-type signal lines, and each of the second-type signal lines comprises a first segment and a second segment separated by the hole area;
   a plurality of first connection signal lines, wherein at least a number of the plurality of first connection signal lines is located in the display area, each of the first connection signal lines comprises a first connection segment, a second connection segment and a third connection segment connected to each other, the first connection segment is electrically connected to the first segment, the third connection segment is electrically connected to the second segment, the second connection segment is connected between the first connection segment and the third connection segment, both the first connection segment and the third connection segment extend along a second direction, and the second connection segment extends along the first direction;
   a plurality of first compensation signal lines, wherein the plurality of first compensation signal lines are located in the display area, the plurality of first compensation signal lines comprise a plurality of first-type compensation signal lines and a plurality of second-type compensation signal lines, the first-type compensation signal lines extend along the first direction, and the second-type compensation signal lines extend along the second direction;
   wherein an orthographic projection of the first connection signal lines on a plane where the array substrate is located does not overlap with an orthographic projection of the pixel circuits on the plane, an orthographic projection of the first compensation signal lines on the plane does not overlap with the orthographic projection of the pixel circuits on the plane, the first-type compensation signal lines are configured to compensate an uneven density of the first connection signal lines in the display area in the first direction, and the second-type compensation signal lines are configured to compensate an uneven density of the first connection signal lines in the display area in the second direction.

2. The array substrate according to claim 1, wherein in the second direction, a line spacing between adjacent first-type compensation signal lines is equal to a line spacing between adjacent second connection segments, and a line width of each of the first-type compensation signal lines is equal to a line width of the second connection segment.

3. The array substrate according to claim 1, wherein, in the first direction, a line spacing between adjacent second-type compensation signal lines, a line spacing between adjacent first connection segments and a line spacing between adjacent third connection segments are equal, and a line width of each of the second-type compensation signal lines, a line width of the first connection segment and a line width of the third connection segment are equal.

4. The array substrate according to claim 1, wherein the array substrate further comprises:
a plurality of first fixed voltage signal lines electrically connected to the pixel circuits and extending along the first direction;
a plurality of second fixed voltage signal lines electrically connected to the pixel circuits and extending along the second direction;
wherein the first-type compensation signal lines are electrically connected to the second fixed voltage signal lines, and the second-type compensation signal lines are electrically connected to the first fixed voltage signal lines.

5. The array substrate according to claim 4, wherein the first fixed voltage signal lines and the second fixed voltage signal lines are located in different film layers, the second connection segment, the first-type compensation signal lines and the first signal lines are arranged to be in a same layer and have a same material, and the first connection segment, the third connection segment, and the second-type compensation signal lines are arranged to be in a same layer and have a same material.

6. The array substrate according to claim 1, wherein the hole area has a centerline in the second direction, the smaller a vertical distance in the second direction between each of the second-type signal lines and the centerline, the smaller a vertical distance in the second direction between the centerline and the second connection segment electrically connected to the second-type signal line, and the smaller a vertical distance in the second direction between each of the second-type signal lines and the centerline, the smaller a vertical distance in the second direction between the centerline and the first connection segment electrically connected to the second-type signal line and a vertical distance in the second direction between the centerline and the third connection segment electrically connected to the second-type signal line.

7. The array substrate according to claim 6, wherein a number of pixel circuits arranged along the second direction in an interval between every two adjacent second connection segments on a same side of the hole area is equal, and a number of pixel circuits arranged along the first direction in an interval between adjacent first connection segments is equal to a number of pixel circuits arranged along the first direction in an interval between adjacent third connection segments;
on a same side of the hole area, a number of pixel circuits arranged along the second direction in an interval between adjacent second connection segments is twice a number of pixel circuits arranged along the first direction in an interval between adjacent first connection segments.

8. The array substrate according to claim 7, wherein pixel circuits arranged along the second direction in an interval between adjacent second connection segments are arranged to be immediately adjacent to each other, and pixel circuits arranged along the second direction in an interval between adjacent first-type compensation signal lines are arranged to be immediately adjacent to each other.

9. The array substrate according to claim 1, wherein the first direction is a column direction, the second direction is a row direction, and the first signal lines are data signal lines; or the first direction is a row direction, the second direction is a column direction, and the first signal lines are scanning signal lines or light-emitting control signal lines or reference voltage signal lines.

10. The array substrate according to claim 1, wherein the first direction is a column direction, the second direction is a row direction, the first signal lines are data signal lines, and the array substrate further comprises:
a plurality of second signal lines, wherein the second signal lines are scanning signal lines or light-emitting control signal lines or reference voltage signal lines, the second signal lines are electrically connected to the pixel circuits and extend along the second direction, the plurality of second signal lines comprise a plurality of third-type signal lines and a plurality of fourth-type signal lines, each of the fourth-type signal lines comprises a third segment and a fourth segment separated by the hole area;
a plurality of second connection signal lines, wherein at least a number of the plurality of second connection signal lines is located in the display area, each of the second connection signal lines comprises a fourth connection segment, a fifth connection segment and a sixth connection segment connected to each other, the fourth connection segment is electrically connected to the third segment, the sixth connection segment is electrically connected to the fourth segment, the fifth connection segment is connected between the fourth connection segment and the sixth connection segment, both the fourth connection segment and the sixth connection segment extend along the first direction, and the fifth connection segment extends along the second direction;
a plurality of second compensation signal lines, wherein the plurality of second compensation signal lines are located in the display area, the plurality of second compensation signal lines comprise a plurality of third-type compensation signal lines and a plurality of fourth-type compensation signal lines, the third-type compensation signal lines extend along the first direction, and the fourth-type compensation signal lines extend along the second direction;
wherein an orthographic projection of the second connection signal lines on the plane where the array substrate is located does not overlap with an orthographic projection of the pixel circuits on the plane, an orthographic projection of the second compensation signal lines on the plane does not overlap with the orthographic projection of the pixel circuits on the plane, the third-type compensation signal lines are configured to compensate an uneven density of the second-type connection signal lines in the display area in the first direction, and the fourth-type compensation signal lines are configured to compensate an uneven density of the second connection signal lines in the display area in the second direction.

11. The array substrate according to claim 10, wherein the array substrate further comprises:
a plurality of first fixed voltage signal lines electrically connected to the pixel circuits and extending along the first direction;
a plurality of second fixed voltage signal lines electrically connected to the pixel circuits and extending along the second direction;
wherein the third-type compensation signal lines are electrically connected to the second fixed voltage signal lines, and the fourth-type compensation signal lines are electrically connected to the first fixed voltage signal lines.

12. The array substrate according to claim 1, wherein in the second direction, a line spacing between the first-type compensation signal line and the second connection segment immediately adjacent to the first-type compensation signal line is equal to a line spacing between adjacent first-type compensation signal lines, and a line spacing between the first-type compensation signal line and the second connection segment immediately adjacent to the first-type compensation signal line is equal to a line spacing between adjacent second connection segments.

13. The array substrate according to claim 1, wherein a line width of each of the first-type compensation signal lines is equal to a line width of the second connection segment.

14. The array substrate according to claim 1, wherein in the first direction, a line spacing between the second-type compensation signal line and the first connection segment immediately adjacent to the second-type compensation signal line is equal to a line spacing between adjacent second-type compensation signal lines, and a line spacing between the second-type compensation signal line and the first connection segment immediately adjacent to the second-type compensation signal line is equal to a line spacing between adjacent first connection segments;

in the first direction, a line spacing between the second-type compensation signal line and the third connection segment immediately adjacent to the second-type compensation signal line is equal to a line spacing between adjacent second-type compensation signal lines, and a line spacing between the second-type compensation signal line and the third connection segment immediately adjacent to the second-type compensation signal line is equal to a line spacing between adjacent third connection segments.

15. The array substrate according to claim 1, wherein a line width of each of the second-type compensation signal lines, a line width of the first connection segment and a line width of the third connection segment are equal.

16. A display panel, comprising the array substrate of claim 1.

17. A display device, comprising the display panel of claim 16.

* * * * *